(12) United States Patent
Caldwell

(10) Patent No.: US 11,018,962 B2
(45) Date of Patent: May 25, 2021

(54) SERVING A NETWORK RESOURCE USAGE FILE

(71) Applicant: Metaswitch Networks Ltd., Enfield (GB)

(72) Inventor: Andrew Munro Caldwell, Enfield (GB)

(73) Assignee: Metaswitch Networks Ltd., Middlesex (GB)

( * ) Notice: Subject to any disclaimer, the term of this patent is extended or adjusted under 35 U.S.C. 154(b) by 0 days.

(21) Appl. No.: 16/752,052

(22) Filed: Jan. 24, 2020

(65) Prior Publication Data

US 2020/0244555 A1 Jul. 30, 2020

(30) Foreign Application Priority Data

Jan. 24, 2019 (GB) ...................................... 1901001

(51) Int. Cl.
*G06F 15/173* (2006.01)
*H04L 12/26* (2006.01)
(Continued)

(52) U.S. Cl.
CPC ............ *H04L 43/062* (2013.01); *G06F 16/10* (2019.01); *G06F 16/27* (2019.01); *H04L 12/14* (2013.01); *H04L 43/06* (2013.01); *H04L 43/067* (2013.01); *H04L 43/0817* (2013.01); *H04L 67/06* (2013.01); *H04L 67/1097* (2013.01); *H04L 69/22* (2013.01); *H04L 69/329* (2013.01); *H04M 15/41* (2013.01); *H04W 4/24* (2013.01); *H04M 2215/0164* (2013.01)

(58) Field of Classification Search
CPC . H04L 43/062; H04L 43/067; H04L 43/0817; H04L 67/06; H04L 67/1097; H04L 69/22; H04L 69/329; G06F 16/10
See application file for complete search history.

(56) References Cited

U.S. PATENT DOCUMENTS 6,714,979 B1 * 3/2004 Brandt .................. H04L 63/166
709/225
7,225,249 B1 * 5/2007 Barry ...................... H04L 41/18
709/227
(Continued)

FOREIGN PATENT DOCUMENTS

GB 2517542 A 2/2016

*Primary Examiner* — Richard G Keehn
(74) *Attorney, Agent, or Firm* — Newport IP, LLC; Han Gim

(57) ABSTRACT

A method of serving a network resource usage record file is disclosed. The method can comprise: storing network resource usage records in a distributed database, the network resource usage records relating to network resource usage in a telecommunications network; sending a file list identifying a network resource usage record file over a file retrieval interface without having constructed the network resource usage record file; receiving, over the file retrieval interface, a request for the network resource usage record file; constructing, in response to the receiving of the request, the network resource usage record file, the network resource usage record file comprising one or more network resource usage records obtained from the distributed database; and serving, over the file retrieval interface, the network resource usage record file.

16 Claims, 2 Drawing Sheets

(51) Int. Cl.
*H04L 29/08* (2006.01)
*G06F 16/10* (2019.01)
*G06F 16/27* (2019.01)
*H04M 15/00* (2006.01)
*H04L 12/14* (2006.01)
*H04L 29/06* (2006.01)
*H04W 4/24* (2018.01)

(56) References Cited

U.S. PATENT DOCUMENTS

| | | | |
|---|---|---|---|
| 7,496,185 B1 | 2/2009 | Primavesi et al. | |
| 2004/0158546 A1* | 8/2004 | Sobel | H04L 67/06 |
| 2009/0122969 A1 | 5/2009 | Dowens et al. | |
| 2020/0233838 A1* | 7/2020 | Morton | G06F 11/1448 |

* cited by examiner

SERVING A NETWORK RESOURCE USAGE FILE

CROSS-REFERENCE TO RELATED APPLICATIONS

This application claims priority to United Kingdom Application No. GB 1901001.6, filed Jan. 24, 2019, under 35 U.S.C. § 119(a). Each of the above-referenced patent applications is incorporated by reference in its entirety.

BACKGROUND OF THE INVENTION

Field of the Invention

The present disclosure relates to serving a network resource usage record file.

Description of the Related Technology

A network element in a telecommunications network may serve network resource usage record files to a downstream system over a file retrieval interface. For example, in an IP Multimedia Subsystem (IMS) network, a Charging Collection Function (CCF) may serve call detail record (CDR) files to a downstream system over a File Transfer Protocol (FTP)-based file retrieval interface.

SUMMARY

According to first embodiments, there is provided a method of serving a network resource usage record file, the method comprising:
  storing network resource usage records in a distributed database, the network resource usage records relating to network resource usage in a telecommunications network;
  sending a file list identifying a network resource usage record file over a file retrieval interface without having constructed the network resource usage record file;
  receiving, over the file retrieval interface, a request for the network resource usage record file;
  constructing, in response to the receiving of the request, the network resource usage record file, the network resource usage record file comprising one or more network resource usage records obtained from the distributed database; and
  serving, over the file retrieval interface, the network resource usage record file.

According to second embodiments, there is provided a data processing node configured to perform a method according to the first embodiments.

According to third embodiments, there is provided a computer program arranged to perform a method according to the first embodiments.

Further features and advantages will become apparent from the following description, given by way of example only, which is made with reference to the accompanying drawings.

DETAILED DESCRIPTION OF CERTAIN INVENTIVE EMBODIMENTS

A network resource usage record file can be constructed before it is requested by a downstream system. A network resource usage record files constructed in this way is ready to be served as and when it is requested by the downstream system.

However, such a network resource usage record file might not, ultimately, be requested by the downstream system. The processing overhead in constructing such a non-requested network resource usage record file is, in effect, wasted. Constructing a network resource usage record file can involve a considerable amount of data retrieval processing.

Instead of constructing a network resource usage record file before it is requested by the downstream system, examples described herein construct a network resource usage record file on-demand and just-in-time to be served to the downstream system if and when the network resource usage record file is requested by the downstream system. This can result in the processing overhead associated with constructing a network resource usage record file only being incurred if and when the network resource usage record file is ultimately requested. In particular, in some examples, a network resource usage record file is only constructed if and when it is requested. Such a processing efficiency gain may result in a delivery efficiency trade-off. In particular, a network resource usage record file that is already constructed before it is requested may be served as soon as it is requested. In contrast, serving a network resource usage record file that has not been constructed when it is requested may involve constructing the network resource usage record file first and then serving the constructed network resource usage record file. Such a delivery efficiency trade-off can, however, be managed and/or made apparent to the downstream system, if desired.

Examples will now be described that can facilitate efficient, horizontally-scalable and redundant storage and serving of a network resource usage record file to a downstream system. Such examples are particularly, but not exclusively, effective in a cloud-based deployment and can provide standards-compliant processing of a network resource usage record file.

Figure 1:
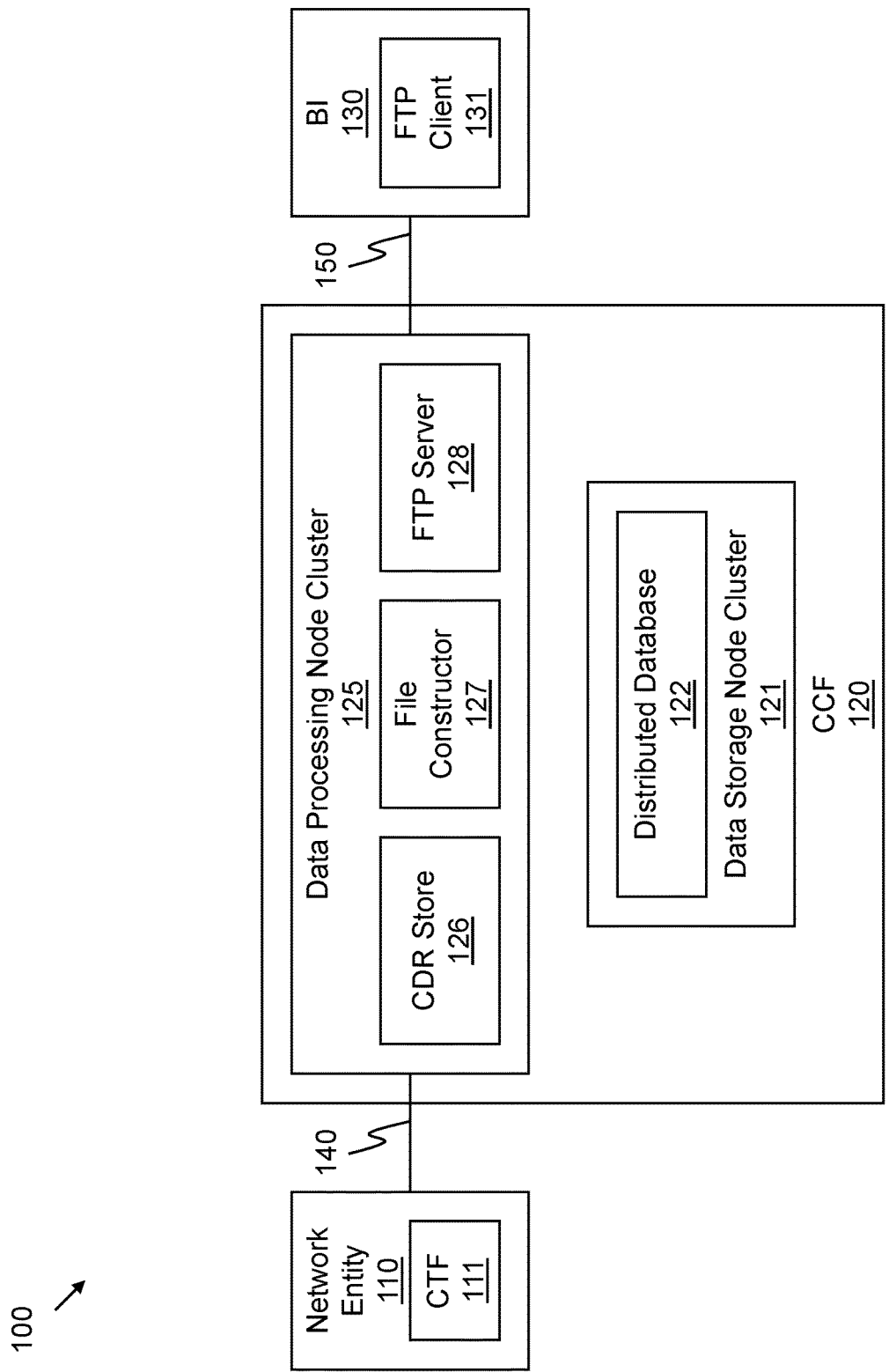
FIG. 1 shows a schematic block diagram of an example of a telecommunications network in accordance with embodiments.

Referring to FIG. 1, there is shown schematically an example of a telecommunications network 100. The telecommunications network 100 provides telecommunications services to subscribers. For example, the subscribers may be able to use the telecommunications network 100 to make and receive telephone calls. Resources are used in the telecommunications network 100 when telephone calls are made and received.

The telecommunications network 100 depicted in FIG. 1 comprises various entities. The entities depicted in FIG. 1 may be embodied as one or more physical resources, or as one or more virtualised resources instantiated on one or more physical resources. The entities may comprise one or more processors and one or more memories. One or more computer programs comprising computer-readable instructions may be stored in the one or more memories. The one or more processors may be configured to execute the computer-readable instructions and perform at least some of the methods and techniques described herein as a result.

In this example, the telecommunications network 100 comprises first and second network entities 110, 120, a downstream system 130, a first interface 140 between the first and second entities 110, 120 and a second interface 150 between the second network entity 120 and the downstream system 130.

In this example, the first network entity 110 generates network resource usage notifications based on network resource usage in the telecommunications network 100. In this example, the second network entity 120 receives network resource usage notifications from the first network entity 110, generates and stores network resource usage records based on the received network resource usage notifications, constructs network resource usage record files on-demand based on the generated network resource usage records, and serves the constructed network resource usage record files to the downstream system 130 based on requests received from the downstream system 130.

Although various elements of the telecommunications network 100 are shown in FIG. 1 and described above by way of example, the telecommunications network 100 may comprise a different arrangement of elements in other examples. For example, the telecommunications network 100 may comprise, more, fewer, different elements etc. In particular, although not depicted in FIG. 1, one or more further entities may be provided between the first and second network entities 110, 120. The one or more further entities may, for example, provide load-balancing functionality. This can enable stateless load-balancing to be used in the telecommunications network 100. Furthermore, the telecommunications network 100 may comprise multiple first network entities 110, multiple second network entities 120, multiple downstream systems 130, multiple first interfaces 140 and/or multiple second interfaces 150.

For convenience and brevity, in this specific example, the telecommunications network 100 comprises an IMS network, it being understood that the telecommunications network 100 may be of another type in other examples. A non-limiting example of another type of network is a next-generation network (NGN).

Examples of the first network entity 110 include, but are not limited to, Proxy-Call Session Control Functions (P-CSCFs) and Telephony Application Servers (TASs). A P-CSCF serves as a Session Initiation Protocol (SIP) proxy in an IMS network. A TAS provides telephony applications and additional multimedia functions in an IMS network.

In this example, the first network entity 110 comprises a component 111 that generates network resource usage notifications based on network resource usage in the telecommunications network 100. In this specific example, the component 111 comprises a Charging Trigger Function (CTF). A CTF generates network resource usage notifications based on the observation of network resource usage in an IMS network. A network resource usage notification may be known as a "billing notification". An example of a network resource usage notification is an ACcounting Request (ACR). Another example of a network resource usage notification is an eXtensible Markup Language (XML)-format notification.

The CTF 111 sends network resource usage notifications to the second network entity 120 over the first interface 140. The first interface 140 may comprise a Diameter-based Rf interface. The Rf interface is a standardised (also known as "standards-defined") interface for offline charging, which uses the Diameter protocol. An Rf interface may be used to provide a standards-compliant interface between the first and second network entities 110, 120. The first interface 140 may comprise a proprietary, XML-based interface that supports XML-format notifications. An XML-based interface may provide a richer source of information than an Rf interface. The first interface 140 may comprise an Rf interface only, an XML interface only, or a combined Rf-and-XML interface. A combined Rf-and-XML interface may provide IMS-compliance with the possibility of richer information reporting.

The second network element 120 generates and stores network resource usage records based on network resource usage notifications received from the CTF 111. The second network element 120 also constructs network resource usage record files on-demand based on the network resource usage records.

For convenience and brevity, in this specific example, the network resource usage records comprise CDRs and the network resource usage record files comprise CDR files, it being understood that the network resource usage records and/or the network resource usage record files may of other types in other examples. A non-limiting example of another type of network resource usage record file, for example, is a diagnostics log file. CDRs may be known as "billing records". CDR files may be known as "billing files". A CDR file may hold (or "contain") CDRs associated with a given period of time. For example, a CDR file may hold CDRs associated with network resource usage in the telecommunications network 100 during a given one-hour period. Different time periods may be used in other examples. CDR files may hold CDRs in a simple, binary format. In particular, the IMS standards specify that CDR files and their constituent CDRs should be encoded in ASN.1 binary according to TS 32.297 and TS 32.298. However, the network resource usage record file could be in a different format. For example, a network resource usage record file could be an XML-format file. A CDR may record network resource usage associated with a single telephone call. A CDR file may comprise, for example, 100,000 CDRs, and may therefore contain data representing network resource usage associated with 100,000 telephone calls over, for example, a one-hour time period.

For convenience and brevity, in this specific example, the second network element 120 comprises a CCF, it being understood that the second network element 120 may be of another type in other examples. A non-limiting example of another type of network element is a Charging Data Function (CDF). A CCF may comprise CDF and Charging Gateway Function (CGF) functionality. CCFs and CDFs are standards-defined network elements that can be used in an IMS deployment. In this example, the CCF 120 is IMS-compliant.

For convenience and brevity, in this specific example, the downstream system 130 comprises a billing infrastructure (BI), it being understood that the downstream system 130 may be of another type in other examples. Non-limiting examples of other types of system are diagnostics systems, analytics systems, network performance systems, network availability systems etc. A BI is sometimes referred to as a billing domain (BD) or billing system (BS).

The second interface 150 between the CCF 120 and the BI 130 comprises a file retrieval interface. In this example, the BI 130 uses the file retrieval interface 150 to retrieve CDR files from the CCF 120. The file retrieval interface 150 may use a file transfer protocol. Examples of file transfer protocols include, but are not limited to, FTP, Secure Socket Shell (SSH) FTP (SFTP), FTP Secure (FTPS) and Secure Copy Protocol (SCP).

In this specific example, the second interface 150, between the CCF 120 and the BI 130, comprises a Bx interface. An IMS-compliant CCF supports the Bx interface.

The Bx interface uses FTP to serve CDR files. As indicated above, the CCF 120 may therefore make CDR files available to the downstream BI 130 over the Bx interface using FTP.

In this specific example, the BI 130 comprises an FTP client 131.

In this example, the CCF 120 is cloud-native and may therefore be referred to as a cloud-native CCF. As such, in this example, the CCF 120 is configured specifically for a cloud computing environment. In particular, in this example, the CCF 120 comprises a cluster of data storage nodes 121 (also referred to herein as a "data storage node cluster") and a separate cluster of data processing nodes 125 (also referred to herein as a "data processing node cluster"). A cluster may also be referred to as a "pool". This arrangement provides separation of data processing and data storage functions within the CCF 120. In this example, the data processing and data storage capabilities of the CCF 120 are separately-scalable. In other words, one of the data processing and data storage capabilities may be scaled without the other of the data processing and data storage capabilities being scaled at the same time. By having separate pools of data storage nodes and data processing nodes, the CCF 120 can thereby provide separate scalability of each pool, compared to a CCF that comprises a single set of nodes where each node in the set handles both data processing and data storage.

The data storage node cluster 121 may comprise an n+k pool of data storage nodes. The data processing node cluster 125 may comprise a separate n+k pool of data storage nodes. A CCF comprising n+k pools in this way can provide increased scalability and more flexibility around a level of redundancy than a CCF with no redundancy or with 1+1 redundancy.

In this example, the data processing capabilities of the CCF 120 can be scaled horizontally. Horizontal scaling may also be referred to as "sideways scaling", "scaling in" or "scaling out". Scaling the data processing capabilities horizontally may involve adding additional data processing nodes to the data processing node cluster 125, or removing existing data processing nodes from the data processing node cluster 125. Data processing capabilities may be scaled based on a trigger event. An example of a trigger event is a Central Processing Unit (CPU) usage exceeding or dropping below a CPU threshold.

In this example, the data storage capabilities can be scaled vertically. Vertical scaling may also be referred to as "scaling up" or "scaling down". Scaling the data storage capabilities vertically may involve adding bigger disks.

The data storage node cluster 121 may provide various services. Examples of such services include, but are not limited to, timers, in-memory data storage and on-disk data storage. Such timers may, for example, correspond to clustered timer functions. In-memory data storage may also be referred to as "short-term data storage" or "temporary data storage". On-disk data storage may also be referred to as "long-term data storage" or "persistent data storage". As such, a data storage node in the data storage node cluster 121 may comprise a timer component, an in-memory data storage component and/or an on-disk data storage component.

In this example, the data storage node cluster 121 stores data redundantly. Storing data with redundancy enables the data storage node cluster 121 to be resilient to a single point of failure (SPOF), namely failure of one data storage node. In this example, data is replicated at a relatively high level. This differs from low-level data replication, which is not optimised for virtualised or cloud environments.

In this example, data stored by the data storage node cluster 121 is accessible by multiple data processing nodes in the data processing node cluster 125, and not just by a single data processing node in the data processing node cluster 125.

In this example, a database 122 is distributed and stored across multiple data storage nodes in the data storage node cluster 121 and is therefore referred to herein as a "distributed database".

In this example, the distributed database 122 stores data redundantly across the data storage node cluster 121. As such, the distributed database 122 provides redundancy, for example using a redundancy mechanism of the distributed database 122.

In this example, the distributed database 122 comprises a horizontally scalable database. Smaller database clusters can perform better and can be easier to maintain than larger database clusters. However, the distributed database 122 can be scaled out, for example to provide additional redundancy.

Examples of the distributed database 122 include, but are not limited to, Apache CouchDB™ and Apache Cassandra™ databases. Apache CouchDB™ and Apache Cassandra™ are examples of NoQSL databases. A NoSQL database enables data to be stored and retrieved using a mechanism that is different from a table-based, relational database model. NoSQL databases may be optimised for storing data in a distributed manner. NoSQL databases may also be cloud-optimised.

In this example, the distributed database 122 stores network resource usage records in the form of CDRs. As such, the distributed database 122 can store individual CDRs, where CDRs for individual telephone calls are stored separately in the distributed database 122.

A CDR may have an associated timestamp. The timestamp of a given CDR may be used as the key for that given CDR in the database 122.

In this example, the distributed database 122 is accessible by multiple data processing nodes in the data processing node cluster 125 and can therefore be considered to be a shared database. The distributed database 122 is shared in that, in this example, any data processing node in the data processing node cluster 125 may access the distributed database 122. For example, any data processing node cluster 125 may be able to append to a currently open CDR. As such, all data processing nodes in the data processing node cluster 125 may be able to write to the same CDR at the same time. By storing CDRs in a shared database, rather than storing them on-disk at individual data processing nodes, the data processing node cluster 125 can appear as a single CCF to the BI 130. For example, the BI 130 may not need to collect CDRs from many individual data processing nodes and combine the CDRs together itself to form a CDR file. The BI 130 may also not need to react to individual data processing nodes going offline, failing etc, where the CCF 120 is resilient to failure of individual data processing nodes in the data processing node cluster 125.

As indicated above, in addition to storing CDRs in the distributed database 122, the CCF 120 could also construct CDR files ahead of them being requested by the BI 130. For example, the CCF 120 could create a CDR file when the first CDR to go into the CDR file has been generated. The CCF 120 could add to the CDR file as further CDRs arrive. The CCF 120 could close the CDR file when full, resulting in a constructed CDR file. The CCF 120 could store the closed, constructed CDR file in a redundant file store and serve up the CDR file when requested by the BI 130. This would, however, involve a significant number of operations on a CDR file that may ultimately not be requested. Redundant file stores that could handle this number of operations and provide the same, or at least a comparable, level of service to that of a database may not be available in practice, or if available may be result in undesirable trade-offs.

In this regard, in this example, the data processing node cluster 125 comprises various data processing components 126, 127, 128 that enable a CDR file to be served, just in time, from the distributed database 122 to the BI 130. Each data processing node in the data processing node cluster 125 may comprise each of the data processing components 126, 127, 128, or the data processing components 126, 127, 128 may be provided across data processing nodes in the data processing node cluster 125. In this example, the data processing components 126, 127, 128 comprise a CDR store component 126, a file constructor component 127 and an FTP server component 128. In this example, the CDR store component 126 is responsible for ownership of and/or communication with the distributed database 122, which stores CDRs. In this example, the file constructor component 127 is arranged to construct CDR files on-demand as described herein. In this example, FTP server component 128 supports communications with the BI 130 using an FTP output stack over a Bx interface.

The data processing node cluster 125 may comprise one or more further components. Examples of such components include, but are not limited to, Rf-handling components, input XML-handling components, aggregation components and transformation components.

The CCF 120 reacts to requests received from the BI 130 over the Bx interface 150. The FTP server component 128 of the CCF 120 may handle such requests. The CCF 120 obtains individual CDRs from the distributed database 122 based on such requests. The CDR store component 126 of the CCF 120 may handle such obtaining. The CCF 120 constructs a CDR file based on the obtained CDRs. The file constructor component 127 of the CCF 120 may handle such constructing. The constructed CDR file may be considered to be a temporary CDR file in that the CDR file may be constructed on-demand, served to the BI 130 and not committed to permanent storage.

The CCF 120 may generate a file list in response to a file listing request or a directory listing request received from the BI 130 over the Bx interface 150. The BI 130 (and/or any other entity trying to access CDR files over a file retrieval interface) can therefore request a list of available CDR files in a directory, before deciding which CDR file(s) to download. However, in accordance with examples described herein, the file list identifies CDR files that have not been constructed (and therefore may be considered not to exist) when the file list is generated and sent to the BI 130. By using such a file list, it appears to the BI 130 making the file listing request or directory listing request that the CDR file(s) indicated in the file list have been constructed and that they are physically located on whichever data processing node in the data processing node cluster 125 the BI 130 sent the file listing request or directory listing request to. The file list may identify at least one given CDR file without having constructed the at least one given CDR file. The at least one given CDR file may not be requested and, ultimately, may not be constructed at all. The processing overhead associated with constructing such a CDR file is therefore saved in such an example.

The data processing node cluster 125 can thereby be provided 'on top' of the data storage node cluster 121. The data processing node cluster 125 is configured to understand the mapping between the CDR files offered to the BI 130 and the keys and values that should be included in those CDR files. The data processing node cluster 125 can expose a standard FTP server on the Bx interface, via the FTP server component 128. However, instead of presenting a list of CDR files found in a folder, or folders, on-disk, the data processing node cluster 125 communicates with the distributed database 122 to determine how to react to FTP client requests from the FTP client 131.

Figure 2:
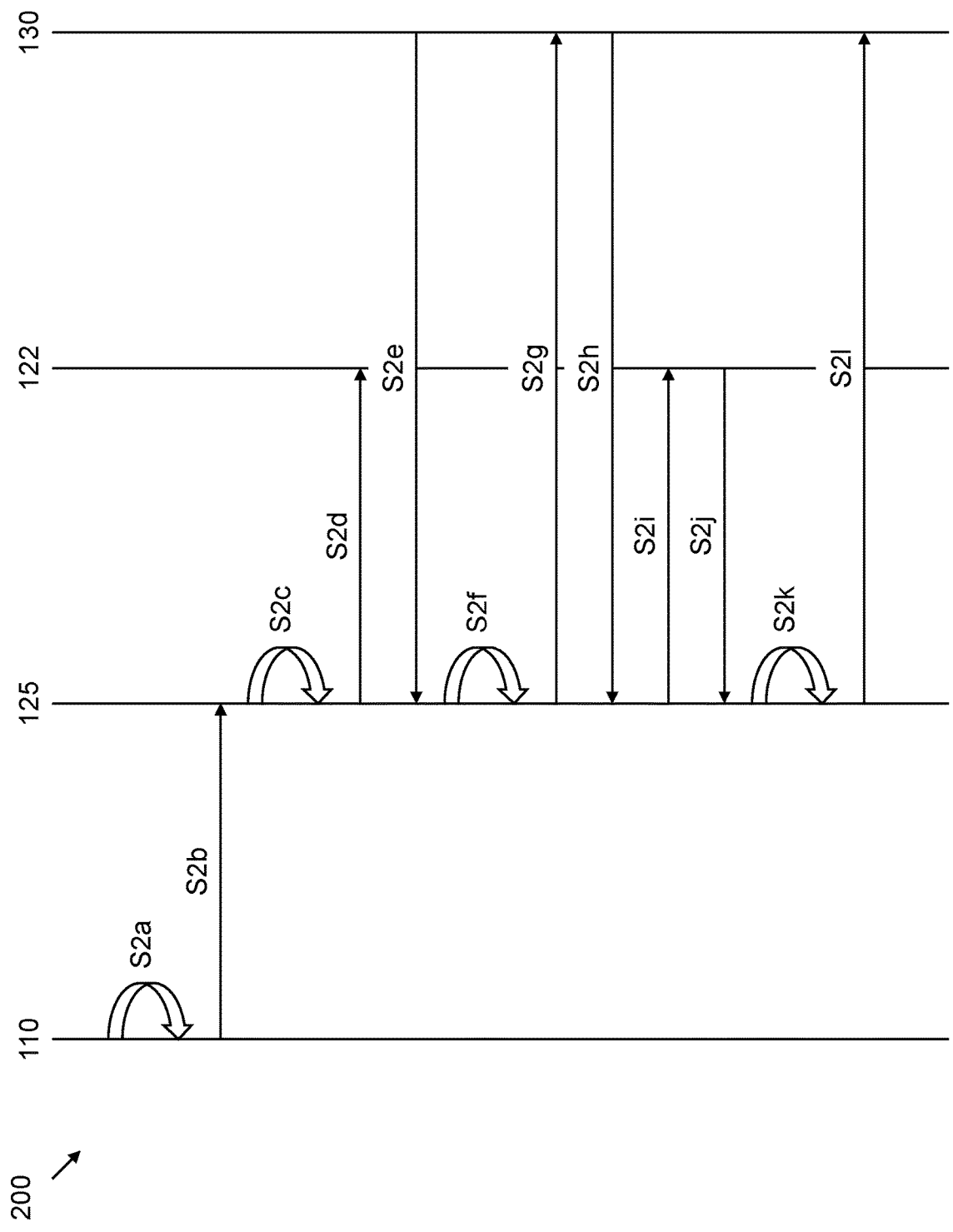
FIG. 2 shows a sequence diagram representing an example of a method in accordance with embodiments, the method being performed in the example telecommunications network shown in FIG. 1.

Referring to FIG. 2, there is shown an example of a method 200 of serving a network resource usage record file.

In this specific example, the method 200 is performed in the example telecommunications network 100 described above. In particular, in this specific example, the method 200 is performed by the cloud-native CCF 120 and involves storing one or more network resource usage records in the form of CDRs in the distributed database 122, constructing a network resource usage record file in the form of a CDR file, and serving the constructed CDR file to the BI 130 over the Bx interface 150.

In this example, a single data processing node in the data processing node cluster 125 receives a request for a CDR file from the BI 130, obtains the relevant CDRs for the CDR file from the distributed database 122, constructs the CDR file on-demand and delivers the constructed CDR file over the Bx interface 150 to the BI 130. The data processing node that receives the request from the BI 130 therefore, in effect, services the request on behalf of the data processing node cluster 125. However, another data processing node in the data processing node cluster 125 could perform at least part of the associated processing in some examples. For example, one data processing node could take over such processing in response to the data processing node that initially services the request, failing, being spun down etc.

Further, in this example, at least one data processing node in the data processing node cluster 125 in addition to the data processing node that services the request on behalf of the data processing node cluster 125 has access to the distributed database 122. As such, in this example, the distributed database 122 is a shared database.

Although FIG. 2 depicts a specific example of a method of serving a CDR file, CDR files can be served in other ways. In particular, the mapping between requests from the FTP client 131 and the consequential back-end processes performed by the CCF 120 is flexible.

At item S2a, the CTF 111 generates a network resource usage notification, as a result of network resource usage in the telecommunications network 100. As indicated above, the network resource usage notification may comprise an ACR or an XML-format notification, for example.

At item S2b, the CTF 111 sends the network resource usage notification to the CCF 120 via the first interface 140. As indicated above, the first interface 140 may comprise an Rf and/or XML interface, for example. The data processing node cluster 125 receives and processes the received network resource usage notification.

Although in this example, at items S2a and S2b, the CTF 111 generates and sends a single network resource usage notification to the CCF 120, the CTF 111 will, in practice, generate and send more than network resource usage notification. Furthermore, the CCF 120 may receive network resource usage notifications from multiple CTFs.

At item S2c, the data processing node cluster 125 generates a network resource usage record in the form of a CDR based on the network resource usage notification of item S2a. The CDR relates to network resource usage in the telecommunications network 100.

At item S2d, the data processing node cluster 125 stores the CDR in the distributed database 122. The CDR store component 126 of may perform such storing. In this specific example, the distributed database 122 is distributed across at least first and second, different geographic locations.

Although in this example, at items S2c and S2d, the data processing node cluster 125 generates and stores a single CDR based on a single network resource usage notification, the data processing node cluster 125 may generate and store more than one CDR. In some examples, the data processing node cluster 125 stores a first CDR in the distributed database 122 in the first geographic location and stores a second CDR in the distributed database 122 in the second geographic location. As such, geographic redundancy can be provided in relation to the CDRs that are stored in the distributed database 122. This can provide resilience to performance-impacting occurrences, for example failures, in one of the two geographic locations.

Further, although in this example, at items S2c and S2d, the data processing node cluster 125 generates a CDR based on a single network resource usage notification, the data processing node cluster 125 may generate a CDR based on more than one network resource usage notification in other examples. For example, a CDR may be generated based on an initial network resource usage notification corresponding to the start of a telephone call, one or more interim network resource usage notifications while the telephone call is ongoing, and a terminating network resource usage notification corresponding to the end of the telephone call. Generating a CDR in this way may, for example, involve creating and storing a partial CDR while the telephone call is in progress and storing a completed CDR when the telephone call has finished.

At item S2e, the BI 130 transmits a directory listing request to the CCF 120 via the Bx interface 150. For example, the BI 130 may request the CCF 120 to list all files in a given directory. The directory listing request may be in accordance with a file transfer protocol, such as FTP, FTPS, SFTP or SCP. For example, an FTP LIST command requests information of a specified file or directory. If no file or directory is specified, information on a current working directory is returned. In addition, an FTP NLST command requests a list of filenames in a specified directory. As indicated above, in this example, a given data processing node in the data processing node cluster 125 processes the directory listing request on behalf of the data processing node cluster 125. The FTP server component 128 may handle the directory listing request. Although in this example the request of item S2e is a directory listing request, the request can be a file listing request, a filename listing request or other type of request in other examples.

At item S2f, the CCF 120 generates a file list. The file constructor component 127 may generate the file list. The file list may identify one or more CDR files without the one or more CDR files having been constructed.

In some examples, the CCF 120 generates a filename for a CDR file to be indicated in the file list without having constructed the CDR file. The CCF 120 may generate the filename for the CDR file to enable the BI 130 to identify the CDR file from the generated file list. As such, the file list can identify the filename for the CDR file. This is despite the CDR file not having been constructed when the directory list request is received from the BI 130, when the filename for the CDR file is generated and when the file list is sent to the BI 130.

The filename for the CDR file may be generated according to one or more rules. The one or more rules enable the filename to be generated in a predictable way without the CDR file having been constructed. In such cases, the filename that the CDR file would have, if constructed, can be provided in the file list even though the CDR file has not been constructed. This can enable the CCF 120 to construct and serve CDR files on-demand.

A filename of a CDR file may be in a predetermined format. The predetermined format may be standards-defined. For example, the filename for the CDR file may be of the form: <timestamp>_<timestamp>.cdr, where the two timestamps give start and end times for the time period contained within the CDR file. Such a time period may be referred to as a "file period". In some examples, the file period itself is not standards-specified. For example, the CCF 120 may be able to select which file period to use for each CDR file. In particular, the CCF 120 may select the same file period for all CDR files, or may use different file periods across the CDR files.

In some examples, the set of CDR files included in the file list covers the timestamp of every CDR stored in the distributed database 122. In such an example, the CCF 120 (for example the FTP server component 128) can report all of the CDR filenames that would be needed such that the timestamp of every CDR in the database 122 is covered by a CDR file in the file list.

The CCF 120 may be able to generate such a file list, in response to the directory listing request, without accessing the distributed database 122. For example, the CCF 120 may know the expiry time of the distributed database 122. The expiry time of the database may correspond to the amount of time that CDRs are stored in the distributed database 122 before being removed. In this specific example, the expiry time of the distributed database 122 is one week. However, the expiry time of the distributed database 122 can be different in other examples. The CCF 120 may also know the file period. In this specific example, the file period is thirty minutes. However, the file period can be different in other examples. The CCF 120 can round up the current time to the nearest single file period (in this specific example, to the next half-hour). The CCF 120 can also round the current time minus the expiry time (in this specific example, one week) down to the nearest single file period (in this specific example, to the nearest half-hour). The CCF 120 can then list CDR files corresponding to all time periods between the rounded-up and rounded-down times. For example, taking the current time as 12:20 pm on 7 Jan. 2018, the file list may be:

201801071200_1230.cdr
201801071130_1200.cdr
201801071100_1130.cdr
. . .
201801011300_1330.cdr
201801011230_1300.cdr
201801011200_1230.cdr As such, in this example, each of the CDR files is indicative of network resource usage in the telecommunications network 100 during a given time period. The filename of each CDR file identifies at least part of the given time period. In this specific example, the filename of each CDR file identifies both the start and end of the given time period. In other examples, the filename of each CDR identifies either the start or the end of the given time period. Where the file period is known and fixed, the other of the start or the end of the given time period can be determined accordingly. As such, in some examples, the filename of identifies a start time of the given time period, an end time of the given time period, or both the start and end time of the given time period.

At item S2g, the CCF 120 sends the file list to the BI 130. At this point in time, the CCF 120 has not constructed any of the CDR files in the file list. As such, the CCF 120 sends the file list which identifies a CDR file without actually having constructed the CDR file. The file list may be in accordance with a file transfer protocol, such as FTP, FTPS, SFTP or SCP. As such, the file list is sent in response to receiving the directory listing request over the Bx interface 150. The FTP server component 128 may handle the sending of the file list to the BI 130.

In some examples, the file list comprises file size information for the CDR file.

In some examples, the size information indicates that the CDR file has a file size of zero. As indicated above, the file list is sent without having constructed the CDR file. A such, the exact size of the CDR file may not be known. A file size of zero may indicate that the CDR file has not yet been constructed. This may indicate to the BI 130 that the CDR file will be constructed on-demand and, therefore, that there may be a delay in serving the CDR file when requested.

In some examples, the file size information indicates an estimated file size for the CDR file. The file size for the CDR file may be estimated without having constructed the CDR file. The file size may be estimated in various ways. For example, the file size may be estimated based on historic CDR file size information. In some examples, the distributed database 122 stores metadata associated with CDRs, where the metadata indicates the size of one or more CDRs stored in the distributed database 122. The CCF 120, for example, the CDR store component 126, may obtain the metadata associated with a CDR in order to estimate the size of the CDR rather than obtaining the CDR itself and analysing the CDR to determine the size of the CDR. Obtaining metadata may be more efficient than obtaining the CDR itself. Where the CDR file comprises multiple CDRs, metadata associated with the multiple CDRs may be obtained and used to estimate the size of the CDR file. Estimating the size of the CDR file may also involve estimating the size of the header of the CDR file.

At item S2$h$, the CCF 120 receives a request. The request may be received on the basis that the FTP client 131 wants to fetch a CDR file included in the file list. As such, the data processing node cluster 125 has received a request for the CDR file over the Bx interface 150. The request of item S2$h$ can identify the filename for the CDR file(s) to be served. The received request may be in accordance with a file transfer protocol, such as FTP, FTPS, SFTP or SCP. For example, an FTP RETR command requests a copy of a specified file. The FTP server component 128 may handle the request.

At item S2$i$, the CCF 120 queries the distributed database 122. In this example, the request of item S2$j$ indicates the filename of a CDR file included in the file list. The CCF 120 inspects the filename of the indicated CDR file. The CCF 120 extracts the start and end timestamps from the filename of the indicated CDR file. The CCF 120 performs a slice fetch from the distributed database 122 based on the start and end timestamps. A slice fetch is a fetch for keys between two values where, in this example, the two values are the start and end timestamps. A slice fetch may also be known as a "slice-get". Such a slice fetch retrieves all of the CDRs that should be included in the indicated CDR file.

At item S2$j$, the CCF 120 obtains the CDR. In this example, the CDR is obtained from the distributed database 122 using at least part of the filename for the CDR file. In this specific example, only part of the filename for the CDR file is used. In this specific example, the start and end timestamp components of the filename for the CDR file are used. The CDR store component 126 may perform the obtaining.

As explained above, in some examples, the distributed database 122 comprises a database that is distributed across at least first and second, different geographic locations. In some examples, the CCF 120 obtains a first CDR from the first geographic location and obtains a second CDR obtained from the second geographic location.

At item S2$k$, the CCF 120 constructs the requested CDR file. In this example, the CCF 120 builds a binary file. The binary file comprises a header, followed by a concatenation of all the CDRs contained in the binary file. As such, the CCF 120 has constructed, in response to the receiving of the request of item S2$h$, the requested CDR file. The constructed CDR file comprises one or more CDRs obtained from the distributed database 122.

In some examples, the constructing of item S2$k$ comprises generating a header for the CDR file based on the one or more CDRs obtained from the distributed database 122 at item S2$j$. The constructed CDR file can thereby comprise the header. The header may indicate the number of CDRs comprised in the CDR file. The header may indicate a file size of the constructed CDR file.

At item S2$k$, the CCF 120 serves the just-constructed CDR file to the BI 130 over the BX interface 150. The CDR file may be served in accordance with a file transfer protocol, such as FTP, FTPS, SFTP or SCP. As such, the CCF 120 has served the requested CDR file over the Bx interface 150.

In some examples, the file retrieval interface 150 supports only two requests, namely a file list request and a file retrieval request. In such examples, no other requests are supported. This can enhance security, reduce complexity, for example.

Although an example filename format for the CDR file is given above, the filename format may be different in other examples. For example, the filename may indicate the particular data processing node in the data processing node cluster 125 that handles the CDR file retrieval request.

In this example, the method 200 described above with reference to FIG. 2 is performed fully in user space and no part of the method 200 is performed in kernel space. User space is sometimes known as "userland". User space corresponds to system memory allocated to running applications. In contrast, kernel space corresponds to system memory allocated to the kernel and the operating system (OS). Separating user space and kernel space can help provide a more stable OS.

As an alternative to performing the method 200 fully in user space, the method could involve kernel space processing. For example, a virtual file system could be used in combination with known FTP, FTPS, SFTP, SCP, etc. stacks. An example of such a virtual file system is Filesystem in Userspace (FUSE), which operates in kernel space. A virtual file system relies on interactions with the kernel. FUSE, for example, calls out to a user-supplied function to determine how to react to clients querying a file system. Such queries may correspond to listing files, reading files, deleting files etc. However, kernel interaction may not be possible in some container environments. As such, use of a virtual file system may not be possible in container environments. In particular, FUSE, for example, works at a lower level than user space and is more intrusive. For example, FUSE affects the file system map of an operating system. By operating fully in user space in accordance with examples described herein, messages received over the Bx interface 150 may thereby be intercepted and responded to directly in a container environment. Such messages may be protocol messages, for example in accordance with a file transfer protocol.

Various optimisations may be performed.

For example, if it expected that a constructed network resource usage record file will either never be fetched or will be fetched multiple times, the constructed network resource usage record file can be stored under the key of the constructed network resource usage record file in the distributed database 122. An example of such a constructed network resource usage record file is a diagnostics log file. A diagnostics log file would typically not be accessed unless an error occurs in the telecommunications network 100. A condition may be imposed that the constructed network resource usage record file is complete in order to be stored in this way. The network resource usage record file being complete may, in this example, correspond to the end time of the network resource usage record file being in the past. Storing a constructed network resource usage record file in this way can avoid needing to rebuild the same network resource usage record file next time the network resource usage record file is requested. If constructed network resource usage record files are only ever fetched once each, however, this processing may not amount to an optimisation.

To make a slice fetch more efficient, CDRs may be stored in the distributed database 122 in rows that hold all CDRs for a small time slice. The column keys may hold the actual timestamp of each individual CDR. This would enable the CCF 120 to request specific rows from the distributed database 122 directly, rather than using a range.

In some examples, the BI 130 may request deletion of an indicated CDR file stored in the distributed database 122. For example, an FTP DELE request may be used to request deletion of an indicated CDR file. If the BI 130 is allowed to delete the indicated CDR file, the CCF 120 may perform an operation that corresponds closely to a fetch operation. In particular, the CCF 120 may determine the rows or row-range that make up the contents of the CDR file to be deleted and drop them from the distributed database 122. In some cases, the CCF 120 may not be able to delete CDR files however.

More complex possibilities are also envisaged.

For example, other bulk retrieval options may be added. This may depend on how the CDRs are stored in the distributed database 122. De-normalisation may be used to store the CDRs in multiple ways, for example. If each CDR is also stored in the distributed database 122 under each user involved in the call, then the CCF 120 may offer per-user CDR files, per-user-range CDR files and/or per-user-group CDR files. In this regard, the CCF 120 would change the query made to the distributed database 122 based on the filename(s) of the requested file(s).

Various measures (for example, methods, data processing nodes and computer programs) are provided in relation to serving a network resource usage record file. Network resource usage records are stored in a distributed database. The network resource usage records relate to network resource usage in a telecommunications network. A file list identifying a network resource usage record file is sent over a file retrieval interface without having constructed the network resource usage record file. A request for the network resource usage record file is received over the file retrieval interface. The network resource usage record file is constructed in response to the receiving of the request. The network resource usage record file comprises one or more network resource usage records obtained from the distributed database. The network resource usage record file is sent over the file retrieval interface.

As such, an efficient and horizontally-scalable architecture may be provided. The network resource usage record file could, instead, be stored on-disk and backed up to prevent, or at least reduce the risk of, the network resource usage record file being lost due to disk failure or instances being torn down by an orchestrator. The network resource usage record file could be replicated 1:1 between primary and backup instances. Further, an element receiving the file list may expect that any network resource usage record files indicated on the list, and which could therefore be served up, are all available on a local disk of a network element that is to serve the network resource usage record file(s). This may be the case where the file retrieval interface uses FTP, for example. Such a network element would need to have access to all network resource usage records generated by the deployment in order to store locally all network resource usage record files that could be served. As a result, a large amount of information would be stored in many places, a network element would become a single point of failure, and/or such a network element would not be horizontally scalable. However, by storing the network resource usage records in the distributed database and constructing the network resource usage record on-demand in the manner described herein, redundancy can be provided in an efficient and horizontally scalable manner. This can enable a large amount of data to be stored and served in an efficient and horizontally scalable way. This particularly, but not exclusively, enhances file retrieval over FTP. An efficient and horizontally scalable, just-in-time NoSQL-backed FTP server can thereby be provided. Such an FTP server can be considered to be "just-in-time" in that network resource usage record files are constructed on-demand, and just in time to be served. Such a server can be backed by a NoSQL database. Such a server can use FTP to serve network resource usage record files.

The constructing of the network resource usage record file may comprise generating a header for the network resource usage record file based on the one or more network resource usage records. The network resource usage record file may comprise the header. This can facilitate serving of a standards-compliant network resource usage record file. For example, a CDR file may be required to have a header to be IMS-compliant. A header can also be effective in other examples, for example to facilitate processing of the network resource usage record file by a downstream system.

The header may indicate the number of network resource usage records comprised in the network resource usage record file. This can also facilitate serving of a standards-compliant network resource usage record file. For example, a CDR file may be required to have a header indicating the number of CDRs comprised in the CDR file to be IMS-compliant. Indicating the number of network resource usage records comprised in a network resource usage record file can also be effective in other examples, for example to facilitate processing of the network resource usage record file by a downstream system. For example, the downstream system may be able to use such information for error-checking purposes, analytics purposes, etc.

The header may indicate a file size of the network resource usage record file. This can also facilitate serving of a standards-compliant network resource usage record file. For example, a CDR file may be required to have a header indicating the file size of the CDR file to be IMS-compliant. Indicating the size of the network resource usage record file can also be effective in other examples, for example to facilitate processing of the network resource usage record file by a downstream system. For example, the downstream system may be able to use such information for error-checking purposes, analytics purposes, etc.

A filename may be generated for the network resource usage record file without having constructed the network resource usage record file. This can facilitate identification of a requested network resource usage record file by a downstream system, while providing the processing efficiency gains described herein.

The file list and/or the received request may identify the filename for the network resource usage record file. This can facilitate identification of a requested network resource usage record file by a downstream system, while providing the processing efficiency gains described herein.

The one or more network resource usage records may be obtained from the distributed database using at least part of the filename for the network resource usage record file. This can facilitate efficient construction of the requested network resource usage record file. In particular, a single data object, namely the filename, can be used both to identify the requested network resource usage record file and as a key for obtaining the one or more network resource usage records to be used to construct the requested network resource usage record file.

The network resource usage record file may be indicative of network resource usage in the telecommunications network during a given time period and the filename may identify at least part of the given time period. This can facilitate particularly efficient construction of the requested network resource usage record file in environments, such as an telecommunications networks, where network usage based on time periods is of interest. The network resource usage record file could be indicative of network resource usage in the telecommunications network based on another factor such as call party, type of telecommunication etc.

The filename may identify a start time and/or an end time of the given time period. This can facilitate particularly efficient obtaining of the requested network resource usage record file. For example, the start time and/or an end time can be extracted from the filename and used directly as a key into the distributed database to obtain the relevant network resource usage records for the requested network resource usage record file.

The file list can comprise file size information for the network resource usage record file. This may be used to inform to a downstream system of the on-demand nature of the processing, or may be used to shield the on-demand nature of the processing from the downstream system.

The file size information may indicate that the network resource usage record file has a file size of zero. This may be used to inform to a downstream system of the on-demand nature of the processing. In particular, the downstream system, or an operator thereof, may realise that a constructed network resource usage record file would not have a file size of zero and can infer that the network resource usage record file has not been constructed.

The file size information may indicate an estimated file size for the network resource usage file. The may be used to shield the on-demand nature of the processing from the downstream system. As such, the on-demand nature of the processing may be transparent to the downstream system.

The file size for the network resource usage file may be estimated without having constructed the network resource usage record file. This can provide the processing efficiency gains described herein, while still shielding the on-demand nature of the processing from the downstream system.

The estimating of the file size may comprise obtaining, from the distributed database, metadata indicating a size of the one or more network resource usage records. Where processing overhead associated with obtaining the metadata is less than the processing overhead associated with obtaining the one or more network resource usage records, a processing efficiency gain may be achieved, while still shielding the on-demand nature of the processing from the downstream system.

The distributed database may comprise a geographically distributed database, distributed across at least first and second, different geographic locations. This can provide a degree of resilience to failures within the telecommunications system through geographic redundancy.

The one or more network resource usage records may comprise a first network resource usage record obtained from the first geographic location and a second network resource usage record obtained from the second geographic location. As such, processing may be compatible with resilient storage arrangements where network resource usage records are stored with geographic redundancy but can nevertheless be compiled into a single network resource usage record file.

The database may comprise a NoSQL database. A NoSQL database model may be particularly effective in the case of distributed database, especially where significant amounts of data are stored. A NoSQL database model may also be more suited to horizontal scaling than relational databases.

The method may be performed in an IMS network. Such methods may provide the processing efficiency gains described herein while still being IMS-compliant.

The method may performed by a data processing node in a cluster of data processing nodes, wherein the data processing node and at least one other data processing node in the cluster of data processing nodes have access to the distributed database. Use of a shared database may result in data storage and/or retrieval efficiency gains, where at least two data processing nodes in the cluster can access the distributed database, for example to store network resource usage records in and/or obtain network resource usage records the distributed database. Resilience to failures in the telecommunications system may also be enhanced.

The method may be performed by a CCF, the one or more network resource usage records may comprise one or more CDRs and the network resource usage record file may comprise a CDR file. As such an efficient, horizontally-scalable CCF may be provided.

The method may be performed in user space. This can enable to processing described herein to be performed in container environments.

The file retrieval interface may use FTP, FTPS, SFTP or SCP. This can enable IMS-compliant processing to be performed. For example, an IMS-compliant charging function need to support the serving of CDR files over FTP.

The file list may be sent in response to receiving, over the file retrieval interface, a file list request. This can enhance efficiency, since the file list can be generated and sent on-demand. Alternatively, a file list could be generated and proactively pushed to a downstream system. However, since there is processing overhead in generating and sending the file list, this pull-based mechanism enables the processing overhead to be incurred when the downstream system is known to want to retrieve network resource usage records.

Various measures (for example, methods, data processing nodes and computer programs) are provided in relation to serving a CDR file. A horizontally-scalable CCF stores CDRs redundantly in a distributed database and constructs CDR files on-demand in response to requests received from a downstream system. Constructing a CDR file on-demand comprises constructing the CDR file in response to receiving a request for the CDR file from the downstream system. The CDR file has not been constructed when the request is received from the downstream system.

The above embodiments are to be understood as illustrative examples. Further embodiments are envisaged.

Examples have been described above in which the distributed database 122 comprises a NoSQL database. In some examples, the distributed database 122 comprises a time series database (TSDB). A TSDB is optimised storing time series data and for handling time-based lookups, for example lookups based on time ranges. Time series data is data in time order. Network resource usage data may correspond to time series data, for example where network resource usage is recorded in CDRs and CDR files.

Examples have been described above in which a file list is sent, a request for a network resource usage record file identified in the file list is received, the requested network resource usage record file is constructed, and the constructed file network resource usage record file is served over a file retrieval interface. In some such examples, the network resource usage record file is fully constructed before any part of the network resource usage record file is served over the file retrieval interface. For example, a header for the network resource usage record file may be generated and one or more network resource usage records may be obtained from the distributed database 122 in order to construct the network resource usage record file, with the constructed network resource usage record file then being served over the file retrieval interface. In other examples, the network resource usage record file is served over the file retrieval interface before the network resource usage record file is fully constructed. For example, in response to receiving the request for the network resource usage record file identified in the file list, a header for the network resource usage record file may be generated and served over the file retrieval interface, then the one or more resource usage records may be obtained from the distributed database 122 and served over the file retrieval interface. As such, in some examples, a file list identifying a network resource usage record file is sent over a file retrieval interface without having constructed the network resource usage record file, a request for the network resource usage record file is received over the file retrieval interface, a header for the network resource usage record file is generated and served over the file retrieval interface, and one or more network resource usage records are obtained from the distributed database and served over the file retrieval interface. The BI 130 may then construct the network resource usage record file based on the header and one or more network resource usage records received over the file retrieval interface.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of serving a network resource usage record file, the method comprising:

storing network resource usage records in a database, the network resource usage records relating to network resource usage in a telecommunications network;

estimating a file size for a network resource usage record file without having constructed the network resource usage record file by obtaining, from the database, metadata indicating a size of the one or more network resource usage records;

sending a file list identifying the network resource usage record file over a file retrieval interface without having constructed the network resource usage record file;

receiving, over the file retrieval interface, a request for the network resource usage record file;

constructing, in response to the receiving of the request, the network resource usage record file, the network resource usage record file comprising one or more network resource usage records obtained from the database; and serving, over the file retrieval interface, the network resource usage record file.

2. A method according to claim 1, wherein said constructing comprises generating a header for the network resource usage record file based on the one or more network resource usage records, wherein the network resource usage record file comprises the header.

3. A method according to claim 2, wherein the header indicates the number of network resource usage records comprised in the network resource usage record file.

4. A method according to claim 2, wherein the header indicates a file size of the network resource usage record file.

5. A method according to claim 1, comprising generating a filename for the network resource usage record file without having constructed the network resource usage record file.

6. A method according to claim 5, wherein the file list and/or the received request identifies the filename for the network resource usage record file.

7. A method according to claim 5, comprising obtaining the one or more network resource usage records from the database using at least part of the filename for the network resource usage record file.

8. A method according to claim 5, wherein the network resource usage record file is indicative of network resource usage in the telecommunications network during a given time period and wherein the filename identifies at least part of the given time period.

9. A method according to claim 8, wherein the filename identifies a start time and/or an end time of the given time period.

10. A method according to claim 1, wherein the file size information indicates that the network resource usage record file has a file size of zero.

11. A method according to claim 1, wherein the method is performed by a data processing node in a cluster of data processing nodes and wherein the data processing node and at least one other data processing node in the cluster of data processing nodes have access to the database.

12. A method according to claim 1, wherein the file retrieval interface uses FTP, FTPS, SFTP or SCP.

13. A method according to claim 1, wherein the file list is sent in response to receiving, over the file retrieval interface, a file list request or a directory listing request.

14. A method according to claim 1, wherein the database is a distributed database.

15. A data processing node comprising non-transitory data storage storing computer-readable instructions that, when executed by one or more processors of the data processing node, cause the data processing node to perform operations comprising:

storing network resource usage records in a database, the network resource usage records relating to network resource usage in a telecommunications network;

estimating a file size for a network resource usage record file without having constructed the network resource usage record file by obtaining, from the database, metadata indicating a size of the one or more network resource usage records;

sending a file list identifying the network resource usage record file over a file retrieval interface without having constructed the network resource usage record file;

receiving, over the file retrieval interface, a request for the network resource usage record file;

constructing, in response to the receiving of the request, the network resource usage record file, the network resource usage record file comprising one or more network resource usage records obtained from the database; and serving, over the file retrieval interface, the network resource usage record file.

16. A non-transitory data storage storing computer-readable instructions that, when executed by one or more processors, cause performance of operations comprising:

storing network resource usage records in a database, the network resource usage records relating to network resource usage in a telecommunications network;

estimating a file size for a network resource usage record file without having constructed the network resource usage record file by obtaining, from the database, metadata indicating a size of the one or more network resource usage records;

sending a file list identifying the network resource usage record file over a file retrieval interface without having constructed the network resource usage record file;

receiving, over the file retrieval interface, a request for the network resource usage record file;

constructing, in response to the receiving of the request, the network resource usage record file, the network resource usage record file comprising one or more network resource usage records obtained from the database; and serving, over the file retrieval interface, the network resource usage record file.

\* \* \* \* \*